Patented Dec. 18, 1945

2,391,218

UNITED STATES PATENT OFFICE 2,391,218

POLYMERIZATION AND INTERPOLYMERIZATION OF ETHYLENE

Reginald George Robert Bacon, Manchester, and Raymond B. Richards, Northwich, England, assignors to Imperial Chemical Industries Limited, a corporation of Great Britain No Drawing. Application February 14, 1944, Serial No. 522,370. In Great Britain January 6, 1943

10 Claims. (Cl. 260—94)

This invention relates to the polymerization of ethylene and the interpolymerization and telomerization of ethylene with one or more compounds.

It is already known that ethylene can be polymerized at very high pressures to yield polythene, if desired using oxygen as a catalyst. It is also known that at high pressures ethylene can be interpolymerized with other organic compounds containing carbon-carbon double bonds and capable of forming polymers. More recently it has been shown that these reactions can be carried out in the presence of an aqueous medium by emulsifying ethylene, or mixtures thereof with other polymerizable substances, in an aqueous solution of an emulsifying agent and heating the emulsion to a temperature of 60°–150° C. after adding oxygen or substances supplying oxygen, generally at pressures of 800–1500 atmospheres. In U. S. Serial No. 328,770 of M. N. Brubaker, filed April 9, 1940 is described and claimed a process whereby ethylene is polymerized alone or interpolymerized with other polymerizable organic compounds having ethylenic unsaturation, in intimate contact with water and a per-compound at a pressure greater than 50 atmospheres and a temperature of 45°–150° C. The per-compounds used to induce the reaction to take place are peroxides, per-acids and per-salts, for example persulphates.

Two further classes of products can also be obtained from ethylene by analogous processes. One of these classes is obtainable by interpolymerizing ethylene with either carbon monoxide or formaldehyde or a formaldehyde-yielding substance, by subjecting them together to an elevated temperature and pressure in the presence of a peroxy compound and preferably in the presence of a liquid medium such as water. Processes for producing these interpolymers are described in U. S. Serial Nos. 449,765 of M. N. Brubaker, filed July 4, 1942 and 449,779 of W. E. Hanford, filed July 4, 1942 respectively. Products of the remaining class are called telomers and are obtained by subjecting ethylene (or other polymerizable aliphatic monoolefinic hydrocarbons) and a tolegen as hereinafter defined to conditions which normally give rise to polymerization of the olefine; such conditions include subjecting them to an elevated temperature and pressure in the presence of a per-compound and an aqueous medium. A process for carrying out such a reaction where the telogens are saturated estadrides of inorganic acids is described in U. S. Serial No. 438,466 of W. E. Hanford et al., filed April 10, 1942; by "saturated estadride" is meant esters or anhydrides of real or hypothetical inorganic acids, which are free from carbon-carbon unsaturation. This process is also applicable to reactions of an aldehyde or a ketone free from carbon-carbon unsaturation and having at least one alpha hydrogen atom.

The object of the present invention is to provide a process for carrying out any of the above reactions more rapidly than has hitherto been possible at a given temperature and pressure, whereby the reactions can be conducted at lower temperatures and pressures than those hitherto possible, and whereby there can be produced products of a higher average molecular weight than those hitherto obtainable. Moreover it is now practicable to obtain products which could hitherto only be made by working in the lower part of the operating temperature range and consequently at an extremely slow speed.

We have found that reactions involving the formation of polymeric materials from ethylene, either alone or in combination with other substances, in the presence of an aqueous medium and of a per-compound, are facilitated and accelerated by the presence of a water-soluble salt of an oxy-acid of sulphur with reducing properties.

According to the present invention, we provide a process which comprises subjecting ethylene alone or with at least one of the compounds comprising compounds having at least one ethylenic double bond, carbon monoxide, formaldehyde or a formaldehyde-yielding substance, a saturated estadride of an inorganic acid, or an aldehyde or ketone free from carbon-carbon unsaturation and having at least one alpha hydrogen atom, to an elevated temperature and pressure in the presence of an aqueous medium and a small amount of a per-compound, together with a water-soluble salt of an oxy-acid of sulphur with reducing properties.

Compounds having at least one ethylenic double bond which may be used or polymerizable compounds containing the group $>C=CH-$, for example vinyl chloride, unsymmetrical dichloroethylene; styrene, butene; vinyl ethers, vinyl ketones, vinyl esters; acrylic and methacrylic acids and their esters, amides and nitriles; and dienes for example butadiene.

As a formaldehyde-yielding substance we may use substances which yield formaldehyde by thermal or catalytic decomposition. Examples of such substances are formalin, paraformaldehyde, polyoxymethylene, α-trioxymethylene, methylal and other formals, and hexamethylene tetramine.

As saturated estadrides we may use chloroform, carbon tetrachloride, methyl chloroiodide and other halogen derivatives of hydrocarbons; chloral hydrate; chloracetic acid and other saturated halogenated carboxylic acids and their esters; dimethyl sulphate, ethyl orthosilicate and other esters of inorganic acids especially of sulphur, phosphorus and silicon.

As aldehydes and ketones free from carbon-carbon unsaturation and containing at least one alpha hydrogen atom, we may use paraldehyde, propionaldehyde, acetone, cyclohexanone, and other substances containing the structure >CH—CO—, preferably those containing from 2 to 8 carbon atoms.

Per-compounds which may be used are those compounds which are either formed by the action of hydrogen peroxide on ordinary acids, or else give rise to hydrogen peroxide on treatment with dilute sulphuric acids. Examples of per-compounds are the peroxides such as benzoyl peroxide and acetyl peroxide; persulphates such as the ammonium, sodium and potassium salts of persulphuric acid; perborates and percarbonates. The amount of per-compound is generally at least 0.1% and up to 5% by weight of the total liquid charge, preferably 0.3–1%.

Examples of suitable water-soluble salts of oxyacids of sulphur with reducing properties are sulphites, dithionites, sulphoxylates, pyrosulphites, bisulphites, and thiosulphates, in particular the sodium salts. The quantity of such salts will usually be less than the amount which is chemically equivalent to the amount of per-compound present, and is generally, but not always, 0.005–5%, preferably 0.02–0.2%, by weight of the total liquid charge.

The aqueous medium employed may be water alone, or water containing other materials such as dispersing agents, buffers or other reagents for adjusting and controlling the pH of the medium, and organic liquids such as isooctane and toluene.

The temperature employed when making polymers of ethylene alone is generally between 50° and 120° C. and preferably between 70° and 100° C., and the pressure generally exceeds 500 atmospheres, preferably being between 800 and 2000 atmospheres. For the manufacture of interpolymers and telomers the same temperature ranges are applicable, but rather lower pressures may be used depending on the second component; pressures exceeding 50 atmospheres, and generally exceeding 200 atmospheres, are used. The process may be carried out continuously, by continuous introduction of the raw materials to the reaction vessel and removal of the mixture containing the product from the reaction vessel, the product being isolated from the mixture for example by filtration, if necessary after coagulation. Vigorous agitation is desirable during the process in order to maintain homogeneous reaction conditions, and it is also desirable to remove the heat evolved during the reaction, preferably by external cooling. The reaction is preferably carried out in a vessel fabricated of or lined with corrosion-resistant material, for example stainless steel. The reaction is preferably carried out in the absence of appreciable amounts of oxygen, and for this purpose the air initially present in the reaction vessel may be displaced or removed before introducing the reaction mixture. Also, to avoid contamination with oxygen it is advisable that the raw materials employed be in a high degree of purity.

The products obtained are essentially of the same character as those obtained by the prior process. Depending on the conditions of polymerization and the initial materials employed, they may vary from liquids and semi-solid substances through waxes to hard, fibrous or rubbery masses of high molecular weight.

The invention is illustrated but not restricted by the following examples in which all parts are by weight.

*Example 1*

A stainless steel bomb is half-filled with 400 parts of water. Three parts of benzoyl peroxide and 0.15 part of sodium dithionite are introduced, and ethylene containing less than 10 parts per million of oxygen is compressed into the bomb. The pressure and temperature are then raised to 750 atmospheres and 75° C. respectively, and the contents of the bomb are stirred for 4 hours. The pressure is then released and the bomb is opened. 80 parts of a tough white solid of molecular weight 17,000 are obtained by separating it from the aqueous phase. For comparison, when the above procedure is repeated without the addition of the sodium dithionite the yield is only 40 parts of a similar solid of molecular weight 15,000.

*Example 2*

A stainless steel bomb is half-filled with 100 parts of water, 100 parts of carbon tetrachloride, 0.5 part of ammonium persulphate, and 0.2 part of sodium dithionite. The bomb is closed and heated to 110° C. and ethylene is admitted so that the pressure is raised to and maintained at 100 atmospheres. After 3 hours the pressure is released and the contents of the bomb are cooled and filtered. The product is 40 parts of mixed ethylene/carbon tetrachloride telomers, the bulk of it being 5, 7 or 9 carbon atom telomers.

In the absence of the sodium dithionite, the same weight of product required 10 hours reaction time.

*Example 3*

A silver-lined bomb is charged with 95 parts of 37% formalin, 0.5 part of benzoyl peroxide and 0.1 part of sodium bisulphite. The bomb is closed, heated to 75° C. and ethylene is admitted so that a pressure of 900 atmospheres is maintained for 2 hours. After this time the bomb is cooled, the pressure is released, and the reaction mixture is discharged and filtered. The product is 15 parts of a white solid which melts at 100° C. and has an ethylene/formaldehyde ratio of 11.

In the absence of sodium bisulphite the same product is only obtained in 10 hours reaction time.

*Example 4*

A silver-lined bomb of capacity 100 parts of water is charged with 80 parts of water, 0.4 part of sodium persulphate and 0.4 part of sodium thiosulphate. The bomb is closed and carbon monoxide admitted to a total pressure of 90 atmospheres. The total pressure is then raised to 600 atmospheres by compressing ethylene into the bomb. The bomb is then heated to 100° C. and more ethylene is admitted to raise the total pressure to 1200 atmospheres at this temperature. After maintaining the temperature at 100° C. for 2 hours the pressure is released and the reaction mixture is discharged and filtered. The product is 9 parts of a solid whose melting point is in the region of 100° C. and which has an ethylene:carbon monoxide ratio of 1.5:1.

What we claim is:

1. A process as claimed in claim 9 in which the water-soluble salt of an oxy-acid of sulphur with reducing properties is sodium hydrosulphite.

2. A process as claimed in claim 9 in which the water-soluble salt of an oxy-acid of sulphur with reducing properties is sodium bisulphite.

3. A process as claimed in claim 9 in which the water-soluble salt of an oxy-acid of sulphur with reducing properties is sodium hydrosulphate.

4. A process as claimed in claim 9 in which the peroxy compound is an alkali metal persulphate.

5. A process as claimed in claim 9 in which the peroxy compound is benzoyl peroxide.

6. A process as claimed in claim 9 carried out at a temperature of 70°–100° C. and a pressure of 800–2000 atmospheres.

7. A process as claimed in claim 9 in which the quantity of water-soluble salt of an oxy-acid of sulphur with reducing properties is less than is chemically equivalent to the amount of percompound present.

8. A process as claimed in claim 9 in which the reaction is carried out in the absence of appreciable quantities of oxygen.

9. A process for the manufacture of polymeric materials which comprises heating ethylene under a pressure of at least 50 atmospheres in the presence of an aqueous medium, from 0.1 to 5% of a peroxy compound, and from 0.005 to 5% of a water-soluble salt of an oxy acid of sulphur with reducing properties selected from the group consisting of sulphites, dithionites, sulphoxylates, pyrosulphites, bisulphites, and thiosulphates.

10. A process for the manufacture of polymeric materials which comprises heating ethylene under a pressure of at least 50 atmospheres in the presence of an aqueous medium and a peroxy compound while in the presence of a water-soluble salt of an oxy acid of sulphur with reducing properties selected from the group consisting of sulphites, dithionites, sulphoxylates, pyrosulphites, bisulphites, and thiosulphates, there being present from 0.3 to 1% by weight of the peroxy compound and a quantity of the salt of an oxy acid of sulphur less than is chemically equivalent to the amount of the peroxy compound.

REGINALD GEORGE ROBERT BACON.
RAYMOND B. RICHARDS.